Feb. 23, 1965     A. B. KEHLET     3,170,660
PARACHUTE GLIDER
Filed Sept. 28, 1962     2 Sheets-Sheet 1
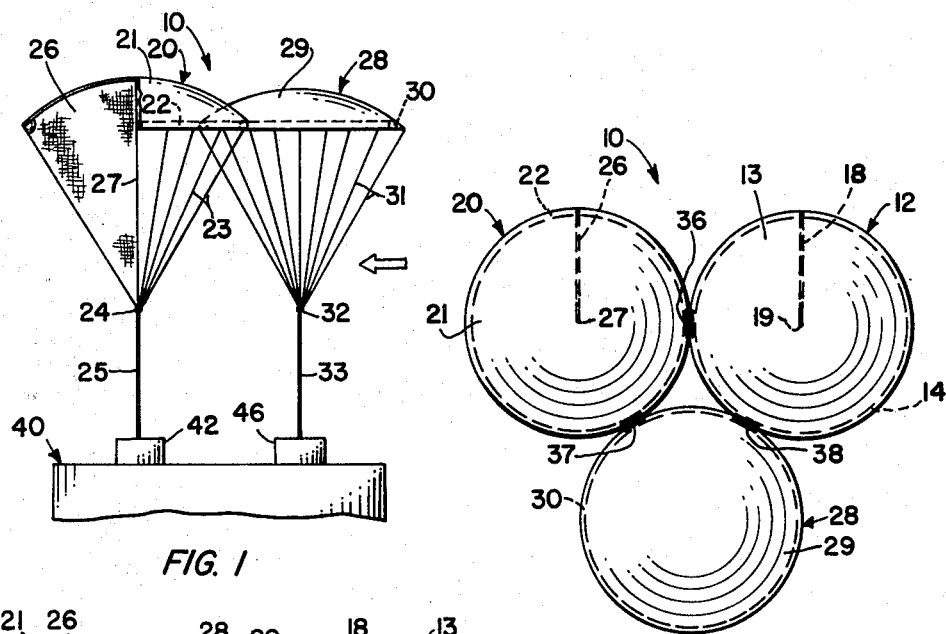
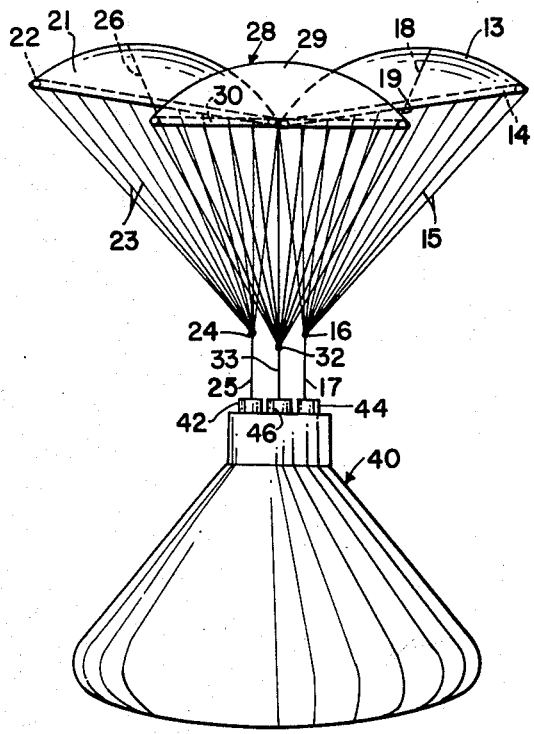
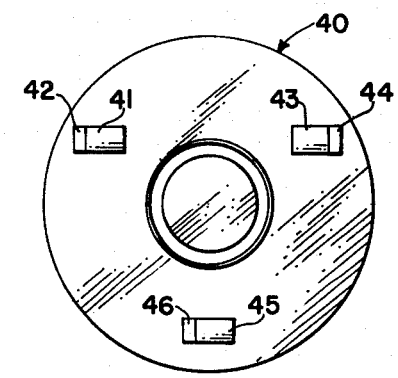
FIG. 1
FIG. 2
FIG. 3
FIG. 4
INVENTOR
ALAN B. KEHLET
BY
ATTORNEYS Feb. 23, 1965   A. B. KEHLET   3,170,660
PARACHUTE GLIDER
Filed Sept. 28, 1962   2 Sheets-Sheet 2

INVENTOR
ALAN B. KEHLET

BY
ATTORNEYS

United States Patent Office 3,170,660
Patented Feb. 23, 1965

3,170,660
PARACHUTE GLIDER
Alan B. Kehlet, Buena Park, Calif., assignor to the United States of America as represented by the Administrator of the National Aeronautics and Space Administration
Filed Sept. 28, 1962, Ser. No. 227,683
21 Claims. (Cl. 244—152)
(Granted under Title 35, U.S. Code (1952), sec. 266)

The invention described herein may be manufactured and used by or for the Government of the United States of America for governmental purposes without the payment of any royalties thereon or therefor.

This invention relates to an aerochute and more particularly to a cluster of parachutes which are controllable.

With the rapid development of the field of space technology, and the contemplated use of the Apollo spacecraft for lunar landing, it has become necessary to develop techniques for landing a spacecraft. Due to the many unknowns regarding the winds on earth, it has been determined that a spacecraft should have a horizontal translation or steering capability.

Many systems have been suggested which could be utilized to facilitate landing of the spacecraft. Among these is the idea of providing the spacecraft with wings similar to conventional aircraft. Although this scheme would provide the necessary maneuverability, it is impractical for many reasons. The use of wings adds additional weight, take up a great amount of space, and usually requires that the spacecraft be powered to render the wings effective. With presently available and immediately foreseeable booster capability, the added weight and space required to make such a spacecraft operable is not feasible.

The use of a parawing or flexible wing is considered a possibility; however, due to the weight of certain proposed spacecraft, a rather large parawing will be necessary to function properly. Experiments have indicated that very large parawings may provide a possible deployment problem.

The use of a parachute has also been proposed. The parachute meets essentially all of the requirements except that of maneuverability. The parachute per se provides only for substantially vertical descent, except as it may be affected by the prevailing wind conditions. Obviously, the use of a parachute would not provide the spacecraft with the capability of landing on a spot selected by the spacecraft pilot.

Since the parachute would seem to have many characteristics desirable for landing a spacecraft except for maneuverability, the solution would seem to be to make the parachute steerable. Existing methods of steering a parachute provide a certain amount of control under no or very little wind conditions; however, lose even this capability in nominal winds.

The aerochute which constitutes the invention here under consideration overcomes the above-mentioned difficulties. Since the aerochute is essentially a cluster of parachutes which are controllable, the many desirable features of a parachute are inherent. The weight and size of the aerochute necessary to properly land a spacecraft of the Apollo size is well within the present and contemplated booster capabilities. There is no particular deployment problem since they are packed and deployed in much the same manner as the conventional parachute.

The state-of-the-art of parachute deployment is well developed and extremely reliable. The aerochute approaches the translational and horizontal landing capability of the parawing for prepared landing areas, and in addition is capable of zero horizontal translation, even in heavy winds, for unprepared landing areas.

In view of the above discussion, it is an object of this invention to provide an aerochute which is capable of being packed and deployed similar to a parachute.

Yet another object of this invention is to provide an aerochute which is controllable in pitch by deflection of a control parachute.

Still another object of this invention is to provide an aerochute which is controllable in yaw by changing the relative positions of adjacent parachutes.

Another object of this invention is to provide an aerochute which is controllable from the spacecraft.

Still another object of this invention is to provide an aerochute which has both horizontal and vertical translation capabilities with a large range of lift-to-drag ratio.

Yet another object of this invention is to provide an aerochute which has a greater lift-to-drag ratio than existing steerable parachutes.

Another object of this invention is to provide an aerochute which is lightweight, occupies a small space when collapsed, and is highly reliable.

Still another object of this invention is to provide an aerochute consisting of clustered parachutes which are capable of landing a very heavy payload.

Another object of this invention is to provide a directional control of the velocity by means of flexible parachute attachments and a fixed rudder.

These and other objects and advantages of the invention will become more apparent upon reading the specifications in conjunction with the accompanying drawings.

In the drawings:

FIG. 1 is a side elevational view showing the aerochute, partially cut away to reveal a rudder;

FIG. 2 is a plan view of the aerochute;

FIG. 3 is a front elevational view of the aerochute and the spacecraft;

FIG. 4 is a plan view of the spacecraft showing the servo motors for controlling the aerochute;

Figure 5:
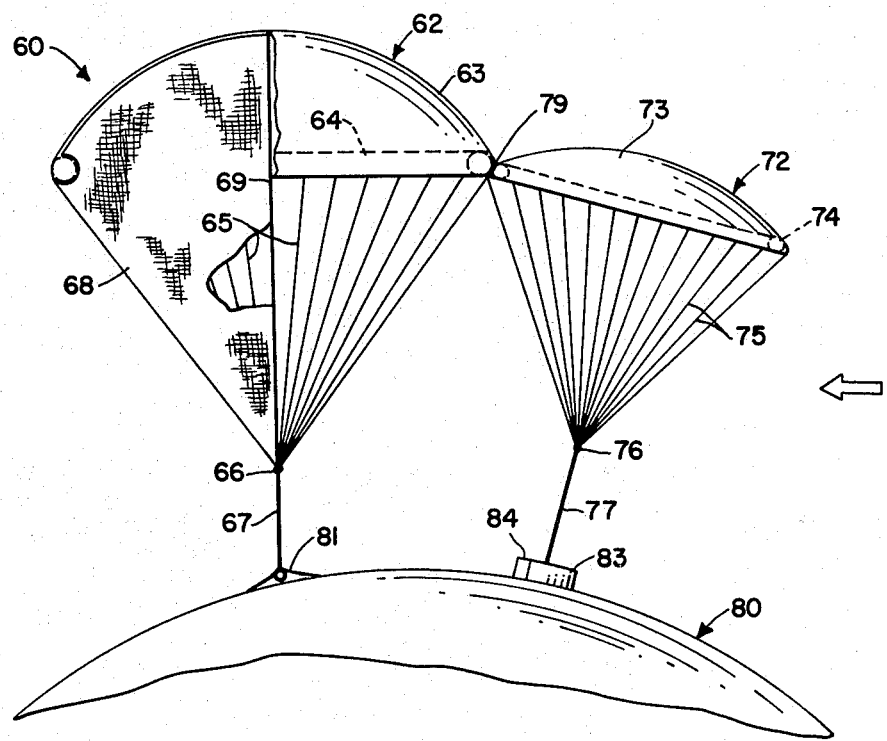
FIG. 5 is a side elevational view of another embodiment of the aerochute partially cut away to reveal the rudder.

Basically, this invention relates to an aerochute which is a cluster of parachutes combined to provide a controllable structure. This is accomplished by hinging together three parachutes at three points along the edges of their canopies. The shroud lines from each parachute are gathered and are connected to three separate control lines which are attached to a servo system carried by the spacecraft. In flight, the parachutes assume what might be termed a triangular relationship. The angular relationship between two of the adjacent parachutes is varied by operation of the servo system to provide yaw control. The third parachute is deflected to provide pitch control. The parachutes utilized for yaw control are provided with rudders for stabilization purposes.

The aerochute is also operable in a configuration where one main chute has hinged to it a control chute. Yaw control here is accomplished by shifting the center-of-gravity of the spacecraft or payload, and pitch control by deflecting the control parachute.

Referring now more specifically to the details of the invention, the aerochute is designed generally by the reference numeral 10. The aerochute 10 includes generally the first main parachute 12, the second main parachute 20, the control parachute 28 and the payload or space vehicle 40 which includes the servo system for control.

The first main parachute 12, illustrated in FIGS. 1 through 3, has a canopy 13 of conventional design. It is of a circular planform, made from semiporous cloth having a maximum thickness at fifty percent of the cord. Shroud lines 15, of about one diameter length, are attached at equally spaced intervals around the edges of the canopy and fixed to a connector 16. The connector 16 may be a ring or binding for joining together the shroud lines at their lower extremities. A control line 17 is fixed to the connector 16 and attached to the servo mechanism of the spacecraft 40 for purposes which will be explained more fully hereinafter.

Surrounding the lower edge of the canopy 13 and being attached thereto in a conventional manner such as by sewing or bonding, is an inflatable tube 14. The tube when inflated lends rigidity to the parachute and provides a more stable airfoil construction. The tube 14 may be inflated by compressed gas carried in a bottle housed within the tube. The release of the gas from the bottle may be controlled remotely, by mechanical or electrical mechanism. Lines from a source of compressed gas within the spacecraft can also connect with the tubes for inflation purposes.

A rudder line 19 is fastened to the apex of the canopy 13 and to the connector 16. A generally triangular-shaped rudder 18 is fixed to the rudder line 19, to one of the shroud lines 15 and to the inner surface of the canopy. The rudder 18 may be fixed in position by sewing or bonding or in some other conventional manner. The rudder 18 operates as a stabilizing member for the aerochute and is positioned to be at the trailing edge of the aerochute. It is constructed from cloth and is fixed rather than movable or controllable.

The second main parachute 20 is essentially identical to that of the parachute 12. It has a canopy 21 to which are attached shroud lines 23. The shroud lines 23 are fixed to the connector 24 which in turn has fastened to it a control line 25. An inflatable tube 22 is secured to the canopy, and a rudder 26 is fastened to a rudder line 27, the canopy 21 and one of the shroud lines 23.

The control parachute or unit 28 is basically similar in design to the main parachutes 12 and 20; however, differs in certain aspects. It has a canopy 29 that may vary in size from half the size of the main canopies 13 and 21 to the same size as the main canopies. Shroud lines 31 are fixed to the canopy and to a connector 32. A control line 33 is joined to the connector 32. The control parachute 28 does not have a rudder. It is provided with an inflatable tube 30 in a manner similar to the main parachutes.

The main parachutes 12 and 20 are joined at the lower peripheral edges of their canopies by a hinge 36. The hinge 36 is made from a heavy flexible material such as cloth or may be constructed from other flexible material. It is bonded or sewn to the canopy or attached in some other conventional manner. The control unit 28 is also joined to the main parachutes by hinges 37 and 38. These hinges are of a design similar to the hinge 36, the hinge 37 joining the main chute 12 to the control chute 28 and the hinge 38 joining the main chute 20 to the control chute 28. As shown in FIG. 2, the hinges form a generally triangular relationship as viewed in plan thereby arranging the parachutes in a similar shape.

The space vehicle or landing craft 40 may take any of several configurations; however, for purposes of illustration is shown as bell-shaped member in FIG. 3. FIG. 4 shows a plan view of the spacecraft and the servo system used for control. The servo system includes a right turn servo motor 41 and its takeup drum 42, a left turn servo motor 43 and its takeup drum and a pitch servo motor 45 and takeup drum 46. As viewed in FIG. 3, the control line 17 is connected to the left takeup drum 44, the control line 25 connected to the right takeup drum 42 and the control line 33 connected to the pitch takeup drum 46. The servo motors can be recessed in the spacecraft or mounted on the exterior. The manner of controlling the aerochute 10 will be explained more fully in the "Operation" of the invention.

Figure 6:
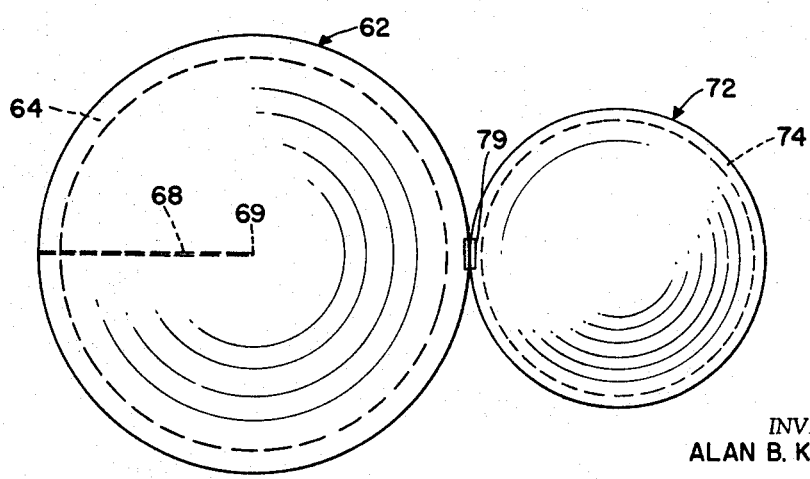
FIG. 6 is a plan view of the aerochute shown in FIG. 5.

FIGS. 5 and 6 show a modified form of the aerochute designated generally by the reference numeral 60.

In this embodiment the aerochute utilizes only one main parachute 62. It has a canopy 63 of conventional design to which are connected shroud lines 65. The shroud lines are gathered at their extremities by the connector 66 also having a control line 67 fastened to it. An inflatable tube 64 is secured to the canopy in much the same manner as in the previously described parachutes and is inflated similarly. The rudder 68 is fixed to one of the shroud lines 65, to a rudder line 69 which is strung between the apex of the canopy 63 and the connector 66, and to the canopy 63. The rudder 68 is positioned such that it will be on the trailing edge of the parachute as presented to the airstream.

A control unit or parachute 72 is connected to the main parachute 62 by a hinge 79. As in the previous embodiment, the hinge connection is made at the edges of the parachute canopies 62 of the main parachute and 73 of the control unit. Shroud lines 75 are fastened to the canopy 73 and are gathered at their lower ends by the connector 76. A control line 77 is fixed to the connector 76.

The aerochute 60 is joined to the space vehicle 80 by the control lines 67 and 77. The control line 67 of the main parachute is fixed to a tiedown 81 which may be chock, eyelet or other conventional attachment device, or a servo motor. The control line 77 is connected to the takeup drum 84 of a servo motor 83.

Operation

The spacecraft 40 or 80 as the case may be is launched into orbit by a booster of existing design, and is propelled toward the destined spatial body by an onboard rocket motor, ion engine or other type of propulsion unit. When the spacecraft is near enough to the spatial body to negotiate a landing, the aerochute assembly is deployed. This is done in a conventional manner, such as by jettison and may include the use of a pilot parachute. As the aerochute unfolds, the inflatable tubes of the various parachutes are filled with gas. The release of the inflating gas may be accomplished by various mechanisms previously explained which are initiated by the astronauts or pilots within the spacecraft. When the aerochute 10 is fully deployed, it will assume a configuration similar to that shown in FIGS. 1 and 3.

When the aerochute is packed it is trimmed to have a lift-to-drag ratio of zero. Thus, upon initial deployment the aerochute will descend vertically, or merely operate as if it were a cluster of parachutes. Horizontal translation, or yaw control is accomplished by differential operation of the right and left servo motors 42 and 44. Differential operation suggests that, for example, the control line of the one main parachute is taken up by one of the servo motors whereas the control line of the other main parachute is played out. Minor turns can be accomplished by operation of either the left or right servo motor alone.

Operation of the pitch servo motor 45 takes in or plays out the control line 33 of the control unit 28 and thereby determines pitch. The amount of control unit deflection also determines the lift-to-drag ratio. The servo motors are selectively energized by the astronauts in the cockpit of the spacecraft. Increased deflection increases the lift-to-drag ratio. Tests have proven that a lift-to-drag ratio of one or better are obtainable with the aerochute.

The single aerochute system 60 shown in FIGS. 5 and 6 is controlled in a different manner. Yaw control in this embodiment is provided by shifting the center-of-gravity of the spacecraft with respect to the aerochute. This can be accomplished in various ways such as by ballast or a directional thrust on the spacecraft. The pitch servo motor 83 is utilized to take in or play out the control line 77 and thereby change the angle of the control unit and thus the pitch of the aerochute. If the member 81 is a servo-motor it also may be utilized for this control. As in the previous embodiment, the deflection of the control unit determines the lift-to-drag ratio of the aerochute.

The rudders 18 and 26 on aerochute assembly 10, and the rudder 68 on aerochute assembly 60 provide stabilization for the aerochutes particularly when they are in horizontal translation or a combination of horizontal and vertical translation. These rudders also tend to prevent spinning of the aerochute on vertical descent.

The inflatable tubes or rings function to stiffen the leading edges of the parachute canopies and provide a parachute planform which is superior aerodynamically to parachutes without this added stiffness.

From the above description, it can be seen that the aerochute of this invention provides an arrangement which is very maneuverable. It provides the further advantage over wing-type vehicles whether rigid or flexible, in that it is capable of vertical descent or having a lift-to-drag ratio of zero. The aerochute has all of the merits of a parachute for use in landing a spacecraft, these being lightweight, a simple and reliable deployment and can be stored in a small space to facilitate launch of the space vehicle. It has the ability to be used in a clustered system and is therefore capable of being used to land very heavy payloads. Control of the aerochute is accomplished by a very simple servo motor arrangement which is of minimum weight and complexity with a high degree of reliability. Since the lift-to-drag ratio of the aerochute is variable over a wide range, it is possible to meet and cope with a variety of landing conditions. Due to the ability to maneuver the aerochute, a low impact velocity for the spacecraft may be obtained.

What is claimed as new and desired to be secured by Letters Patent is:

1. An aerochute comprising: a first parachute; a second parachute; first flexible means for connecting said parachutes; a third parachute; second flexible means connecting said third parachute to said first and second parachutes, and control means for moving said first, second, and third parachutes relative to each other to provide yaw and pitch movement of said aerochute.

2. An aerochute as in claim 1 wherein said flexible means is a hinge.

3. An aerochute as in claim 1 wherein said second flexible means is a pair of peripherally spaced hinges.

4. An aerochute as in claim 1 wherein certain of said parachutes have a rudder to provide for stability.

5. An aerochute as in claim 1 wherein two of said parachutes have rudders to provide stability.

6. An aerochute as in claim 1 wherein said aerochute is connected by control lines to a payload; said payload having servo motors operative on said control lines to vary the relative position of said first, second, and third parachutes.

7. An aerochute as in claim 1 wherein said parachutes have canopies, and means to stiffen the peripheral edges of said canopies.

8. An aerochute as in claim 7 wherein said stiffening means is an inflatable tube.

9. An aerochute comprising: a first parachute having a canopy; a second parachute having a canopy; a first hinge joining the canopies of said first and second parachutes at their peripheral edges; a control parachute having a canopy; a second hinge joining said first parachute and said control parachute at their peripheral edges; a third hinge joining said second parachute and control parachute at their peripheral edges; and control means for moving said first, second, and control parachutes relative to each other to provide yaw and pitch movement of said aerochute.

10. An aerochute as in claim 9 wherein said first, second and control parachutes have shroud lines, connection means at the lower extremities of the shroud lines of the respective parachutes, a control line fastened to each connection means, a servo motor connected to each control line to take in or play out the control line to provide relative movement between said first, second and control parachutes.

11. An aerochute as in claim 9 wherein said first and second parachutes have shroud lines; first and second connectors for gathering the lower extremities of said first and second parachute shroud lines; first and second rudder lines fastened to said first and second connectors and to the apex of said first and second parachutes; and first and second rudders fixed to said first and second rudder lines and to the canopies and a shroud line of said first and second parachutes.

12. An aerochute as in claim 9 wherein said first, second, and control canopies respectively have an inflatable tube fixed to their peripheral edges for stiffening.

13. An aerochute comprising: a first parachute having a canopy; a second parachute having a canopy; a first hinge joining the canopies of said first and second parachutes at their peripheral edges; a control parachute having a canopy; a second hinge joining said first parachute and said control parachute at their peripheral edges; a third hinge joining said second parachute and control parachute at their peripheral edges; said first, second, and control parachutes having shroud lines; first, second, and control connectors gathering the lower extremities of the respective shroud lines; first and second rudder lines fastened to said first and second connectors and to the apex of said first and second parachutes; and first and second rudders fixed to said first and second rudder lines and to the canopies and a shroud line of said first and second parachutes; a control line fastened to each connection means, and a servo motor fastened to each control line to take in or play out the control line to provide relative movement between said first, second and control parachutes.

14. An aerochute as in claim 13 wherein said first, second and control parachute canopies have inflatable tubes secured to their peripheral edges to provide stiffness.

15. An aerochute comprising: a plurality of parachutes, said parachutes having canopies hinged together, and control means connected to said parachutes to independently and conjunctively vary their relative positions and thereby control said aerochute.

16. An aerochute comprising: a foldable airfoil; means for expanding said airfoil; said airfoil having a plurality of sections; flexible means interconnecting said sections, and control means for independently and conjunctively moving said sections to provide both horizontal and vertical translation of said aerochute.

17. An aerochute comprising: a main parachute; a control parachute; a hinge joining said main parachute and said control parachute; control means fastened to said main parachute and to said control parachute to independently and conjunctively move one relative to the other and thereby determine the lift-to-drag ratio of said aerochute.

18. An areochute comprising: a main parachute having a canopy; a control parachute having a canopy; a hinge joining said main and control chute canopies at their peripheral edges; said main and control parachutes having shroud lines; a separate connector for gathering the lower extremities of the respective parachute shroud lines; a control line fastened to each of said connectors; and a payload having a chock and a servo motor; one of said control lines being fixed to said chock and the other control line connected to said servo motor; one servo motor being operative to take in or play out the associated control line to vary the lift-to-drag ratio of said aerochute.

19. An areochute as in claim 18 wherein the control line associated with said control parachute is connected to said servo motor.

20. An aerochute as in claim 18 wherein a rudder line is secured between said main parachute connector and canopy; a rudder fixed to said rudder line, said main parachute canopy and a shroud line thereof.

21. An areochute as in claim 18 wherein said main and control parachute canopies have inflatable tubes fastened to their peripheral edges to stiffen the canopies.

References Cited by the Examiner

UNITED STATES PATENTS

| | | | |
|---|---|---|---|
| 1,287,134 | 12/18 | Swanson | 244—152 X |
| 1,903,213 | 3/33 | Gleason | 244—146 |
| 2,048,159 | 7/36 | Hoffman | 244—142 |
| 2,536,777 | 1/51 | Smith | 244—142 |
| 3,104,857 | 9/63 | Knacke et al. | 244—145 |
| 3,117,753 | 1/64 | Ewing | 244—145 |

FOREIGN PATENTS

| | | |
|---|---|---|
| 497,448 | 12/39 | Great Britain. |
| 1,121,072 | 4/56 | France. |
| 1,202,409 | 7/59 | France. |

FERGUS S. MIDDLETON, *Primary Examiner.*